United States Patent [19]

Hill et al.

[11] 4,422,022

[45] Dec. 20, 1983

[54] SPEED CONTROL FOR TRUCK

[75] Inventors: Walter A. Hill; Andrew C. Stevenson; Peter G. McKenna, all of Peterborough, Canada

[73] Assignee: Canadian General Electric Company Limited, Toronto, Canada

[21] Appl. No.: 376,288

[22] Filed: May 10, 1982

[30] Foreign Application Priority Data

May 29, 1981 [CA] Canada .................................. 378638

[51] Int. Cl.³ ............................................. H02P 3/14
[52] U.S. Cl. .................................... 318/376; 318/381
[58] Field of Search ............... 318/367, 368, 370, 371, 318/372, 373, 375, 376, 378, 381, 261, 269, 350, 338, 139, 256-260, 288, 314, 318, 341, 345

[56] References Cited

U.S. PATENT DOCUMENTS

| | | | |
|---|---|---|---|
| 3,590,350 | 6/1971 | William | 318/269 X |
| 3,599,064 | 8/1971 | Friedman | 318/338 |
| 3,795,850 | 3/1974 | Grygera | 318/257 X |
| 3,950,684 | 4/1976 | Peterson | 318/338 |
| 4,019,107 | 4/1977 | Dixon et al. | 318/338 |
| 4,300,079 | 11/1981 | Kawada et al. | 318/338 X |
| 4,386,303 | 5/1983 | Kleptz | 318/258 X |

FOREIGN PATENT DOCUMENTS 1060538  8/1979  Canada .................................. 318/84

Primary Examiner—J. V. Truhe
Assistant Examiner—Shik Luen
Attorney, Agent, or Firm—Raymond A. Eckersley

[57] ABSTRACT

A speed control for a DC motor drive having regenerative braking and a field reversing control, has a field current feedback circuit which includes a modifier to change the feedback signal in accordance with the saturation curve of the field to provide a feedback signal representing field strength or field flux. Because motor field strength is regulated as a function of the required field strength, the control tends to make the speed of response independent of actual field strength. Also, a feedback signal is provided which is a function of the product of actual field strength and desired armature current, i.e., related to torque, and this controls the speed signal so that the gain of the speed regulating amplifier is inversely proportional to field strength. This allows drive operation at reduced field strength while maintaining the response.

8 Claims, 3 Drawing Figures

4,422,022

SPEED CONTROL FOR TRUCK

BACKGROUND OF THE INVENTION

This invention relates to controls for direct current motor drives, and in particular it relates to motor drives where regenerative control is required.

Direct current motor drives having controls which provide regenerative braking have many applications, for example, in hoists, cranes and vehicle drives. The present invention will be described with reference to improved control for vehicle drives. Control systems are well known for controlling direct current or DC motor drives for vehicles. Such control systems provide for speed control during motoring and also provide control during regenerative braking where the motor acts as a generator and returns electrical power to the power source. One type of regenerative braking control reverses the motor field during braking, as opposed to reversing armature current, and this is termed a field reversing control. The present invention is concerned with a field reversing type control. In this type of control it has been found to be necessary, or at least highly desirable, to coordinate the control of armature current with that of field current during reversal of the field. This coordination of control avoids or reduces sparking which might occur when the field was weak but the armature current was not weak, as well as reducing the possibility of some forms of instability. There are several means of coordination of the control of field current and armature current known in the prior art. One such means controls the armature current with field reversal for regenerative braking, by reducing armature current to zero as the field current is reduced to zero in the process of reversal. Then the armature current is allowed to increase as the reversed field current increasess, at least during the transient situation where the field is relatively weak. As the field response is much slower than the armature current response, the time taken for reversal is increased in accordance with the field current response. In addition, this prior art system restricts control response during at least the initial part of field reversal.

During the time period when the field current is low and armature current is low, the motor torque is reduced quite considerably. A very low motor torque may result in instability.

SUMMARY OF THE INVENTION

It is therefore an object of the invention to provide a regenerative DC motor control having torque compensation.

It is another object of the invention to provide an improved control for a DC motor vehicle drive with field reversing in which response is increased during the time of field reversal and the possibility of instability is reduced.

The present invention provides motor torque compensation to reduce the possibility of instability and to increase control response.

The present invention also provides means for reversing the motor field much more rapidly than it could be done normally, this is, in a fraction of the motor field time constant, so that the actual field can follow the regulator more quickly. This reduces the time during which there is a possibility of instability, and it tends to maintain a constant motor torque.

Accordingly there is provided a motor control for a direct current motor having an armature and a field winding, and having a power source for providing armature current and for providing field current. The motor is operable in a motoring and in a regenerative braking state with field reversal in the braking state. The control comprises means for providing a first control signal representing the difference between an input speed reference signal and an actual motor speed signal, means for deriving a signal representing field current into a signal representing field strength, means for modifying the first control signal by summing it with a compensating signal derived from a product of limited value of the signal representing field strength and a predetermined fraction of the first signal to provide torque compensation, and means responsive to the modified first signal for controlling armature current and field strength.

DESCRIPTION OF THE PREFERRED EMBODIMENTS

Figure 1:
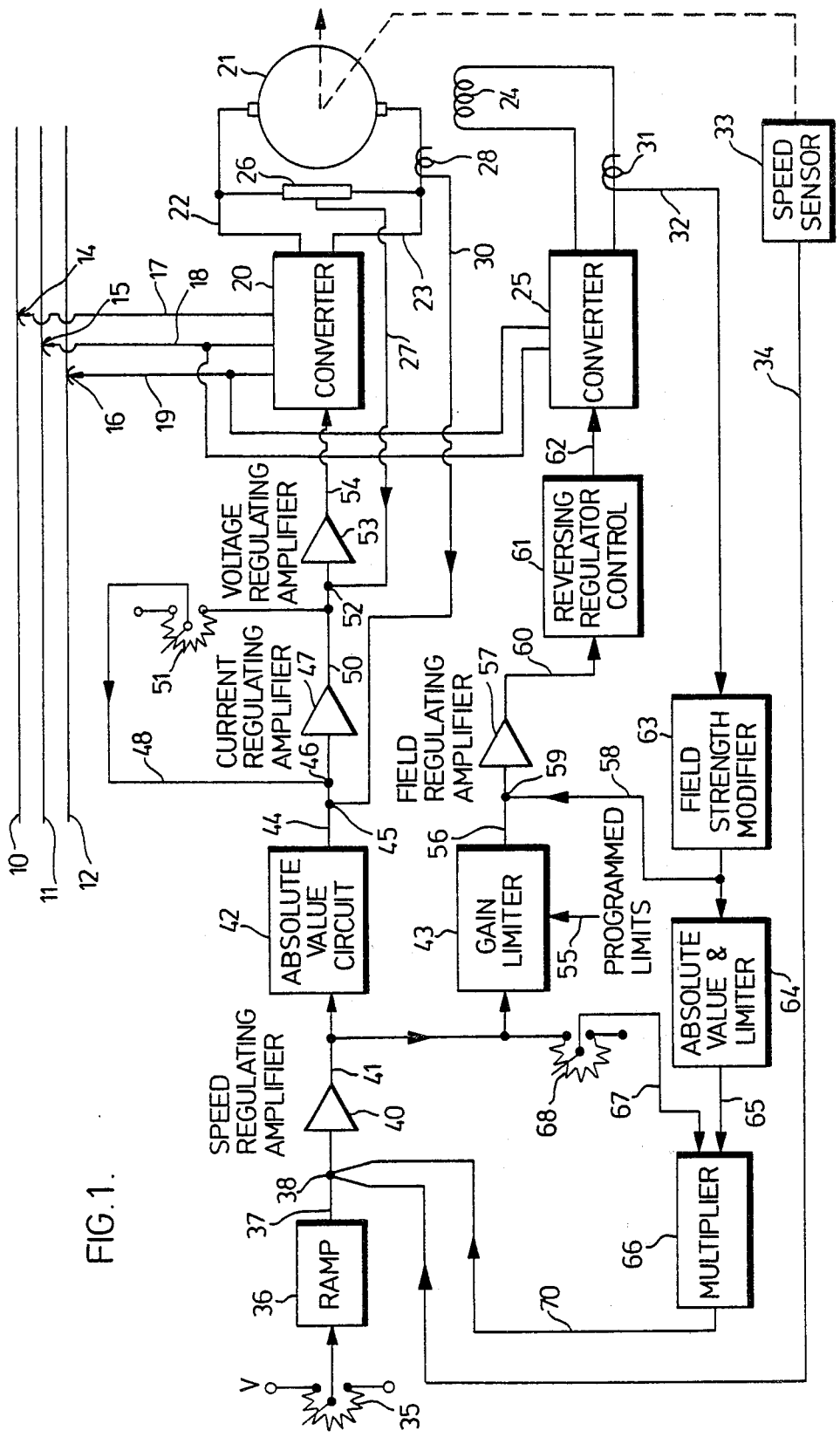
FIG. 1 is a simplified schematic drawing of a motor control system according to the invention.

Referring to FIG. 1 there is shown a control system for a vehicle drive. The particular form of drive shown is a truck drive which receives its power from a three phase power source represented by wires 10, 11 and 12 through a pick-up indicated by 14, 15 and 16. Three conductors 17, 18 and 19 conduct the electrical power from the pick-ups 14, 15 and 16 respectively, to main converter 20. The converter 20 is a controlled converter that provides the armature current for the armature of DC motor 21 over conductors 22 and 23. Conversely, during regenerative braking, converter 20 provides and AC output over conductors 17, 18 and 19 back to the power system. Thus, converter 20 must be capable of operation in the first and fourth quadrants as is known in the art.

It will, of course, be apparent that the power for driving motor 21 need not necessarily come from wires over a pick-up arrangement. The power could, for example, as an alternative, come from a diesel driven generator carried on the vehicle, and it need not be three phase power.

The field 24 for motor 21 is provided with power from a field converter 25 which receives AC power from an extension of conductors 18 and 19. The current through the field 24 must be capable of flowing either way as required in a field reversing type of control. Consequently, the output of converter 25 is capable of reversing.

There are four signals obtained from the drive for use by the control system. The first is an armature voltage feedback signal obtained from resistance 26 connected across the armature between conductors 22 and 23 and provided on conductor 27. The second is an armature current feedback signal obtained from a current sensor 28 and provided on conductor 30. The third is a field current feedback signal obtained from current sensor 31 and provided on conductor 32. The fourth is a speed signal obtained from the drive shaft of motor 21 by a sensor 33, for example, a tachometer, the provides on conductor 34 a signal representing motor speed. It is known to use these signals, or combinations of at least three, in various ways to control a drive.

The input to the control system is a command signal shown as coming from a potentiometer 35 which, in the case of a truck might be operated by a foot pedal. The signal is applied to ramp circuitry 36 which provides a smoothly varying output signal in accordance with the speed required by the command input. This signal is on conductor 37 and is applied to summing point 38. Two other signals are applied at summing point 38 and one of these is the signal on conductor 34 representing actual motor speed. Neglecting for the time being the third signal at summing point 38, it will be seen that there is a signal representing desired speed from conductor 37 and a signal representing actual speed from conductor 34. The difference in these two signal represents a speed error signal which is applied to speed regulating amplifier 40, and the amplified error signal is on conductor 41 which is applied to absolute value circuit 42 and to a gain and limiter circuit 43.

The absolute value circuit 42 provides on conductor 44 a signal representing an amplified speed error signal but without regard to sign. At summing point 45 this is summed with the signal on conductor 30 representing armature current (which is also a unidirectional signal as the armature current does not reverse) and the difference signal is applied to summing point 46. Summing point 46 is provided to permit an adjustable feedback signal to be applied around current regulating amplifier 47. That is, the signal from summing point 45 is summed at summing point 46 with a feedback signal on conductor 48 and the difference applied to amplifier 47. The output from amplifier 47 is on conductor 50 and is applied to an adjustable control shown as potentiometer 51 and a selected portion is fed back to summing point 46 as described.

The signal on conductor 50 represents a desired armature voltage which will cause the desired armature current and this is applied to summing point 52 as well as the signal on conductor 27 representing actual armature voltage. The difference signal or error signal is amplified by voltage regulating amplifier 53 and the amplified signal on conductor 54 is applied to converter 20 to control the firing of the SCRs (silicon controlled rectifiers) in converter 20.

It should be noted that the use of the voltage regulator is not necessary in some applications, for example, where the control need not be as precise. In such a case, the voltage feedback signal on conductor 27 would not be required, nor would the voltage regulating amplifier 53. The conductor 50 would be connected directly to converter 20. However, the use of a voltage regulator, as shown, is preferred.

The signal on conductor 41, it will be recalled, was applied to gain and limiter circuit 43 where it is amplified and limited by an upper and lower limit set into the circuitry at input 55. The output from circuit 43 is on conductor 56 and it is applied to a summing point 59 wherein it is summed with a modified field current signal on conductor 58 and the difference is applied to field regulating amplifier 57. The output from the field regulating amplifier 57 is on conductor 60 and is applied to a reversing and regulating control circuit 61 which provides appropriate signals on conductor 62 to converter 25 to control the firing of the SCRs therein.

Describing now circuitry of particular significance in providing the features of the present invention, the conductor 32 is connected to field strength modifying circuitry 63 to apply thereto a signal representing field current. The circuitry 63 modifies or shapes the signal in order to convert the input signal on conductor 32 into a signal which represents field strength. In other words, the circuitry of block 63 simulates the saturation curve of the motor field current versus motor field strength. Therefore, the output signal on conductor 58 represents motor field strength. The output from field modifying circuitry 63, on conductor 58, is applied to summing point 59 and to absolute value and limiter circuitry 64. It will be seen that circuitry 63 can control the field current signal (i.e. field strength signal) that is fed back in such a manner as to increase the field response considerably. The circuitry 64 provides on conductor 65 a signal representing modified field current (i.e. field strength) but without regard to sign and limited at a predetermined lower value. Conductor 65 is connected to a multiplier 66 as one input. Conductor 67 is connected to another input of multiplier 66 applying thereto a fraction of the amplified speed difference signal from conductor 41—the fraction being determined by the setting of potentiometer 68. The multiplier 66 provides on conductor 70 a signal representing the product of the signals on conductors 65 and 67, that is, of the fraction of the speed error signal and the limited absolute value of a modified field current signal. It is important to note that the gain of the speed regulating amplifier 40 is inversely proportional to motor field strength. Thus, the response of the speed regulating system remains constant even when the field strength of the driving motor is changing.

The operation of the speed control will be apparent from the preceding description, but will be given in brief form to ensure complete understanding.

When the operator depresses the foot pedal or other control to accelerate to a desired speed, the arm of potentiometer is moved accordingly to provide a signal to ramp circuitry 36 representing a desired speed. Ramp circuitry 36 controls the increase to a desired acceleration rate or ramp and provides the appropriate speed signal on conductor 37. This is summed with an actual speed signal from conductor 34 and with a speed signal on conductor 70 related to field strength and to desired armature current, that is, related to torque. The resulting signal represents a desired armature current and field. It is summed with an actual armature current signal to provide an armature current difference signal and amplified by current regulating amplifier 47. The signal from aplifier 47, representing a desired armature voltage which will provide the desired armature current, is summed with an actual armature voltage signal from conductor 27, amplified and used to control converter 20 to increase its output for acceleration of the motor to its selected speed. The signal from conductor 41 is also summed (after limiting) with a modified actual field current signal (i.e. representing field strength) and amplified by field regulating amplifier 57. The signal from amplifier 57 is applied to a regulator which regulates converter 25 to provide an appropriate field current to accelerate the motor to its desired speed.

The field modifying circuit 63 provides an improved operation because it converts the field current feedback signal into a signal proportional to field strength or field flux. Thus the motor field strength is regulated as a function of the field strength reference on conductor 56. This tends to make the speed of response independent of actual motor field strength. Without this arrangement, the response speed would be different at a low field strength than at a higher field strength.

The torque compensating circuit which includes the absolute value and limiter 64 and the multiplier 66 provides a feedback signal that is a product of a signal representing a desired armature current which is summed into the control at summing point 38. This improves the operation by making the gain of the speed regulating amplifier 40 inversely proportional to field strength, thereby allowing driver operation with reduced field while keeping the response of the speed regulating system the same.

Figure 2:
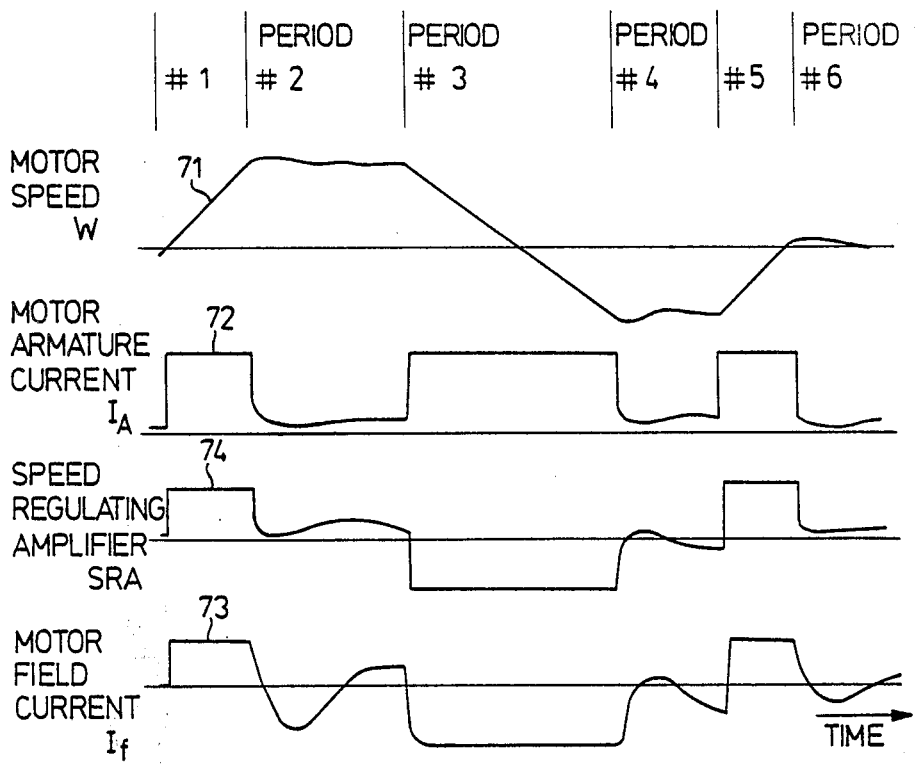
FIGS. 2 and 3 are curves useful in comparing operation with and without the compensating features of the invention.
Figure 3:
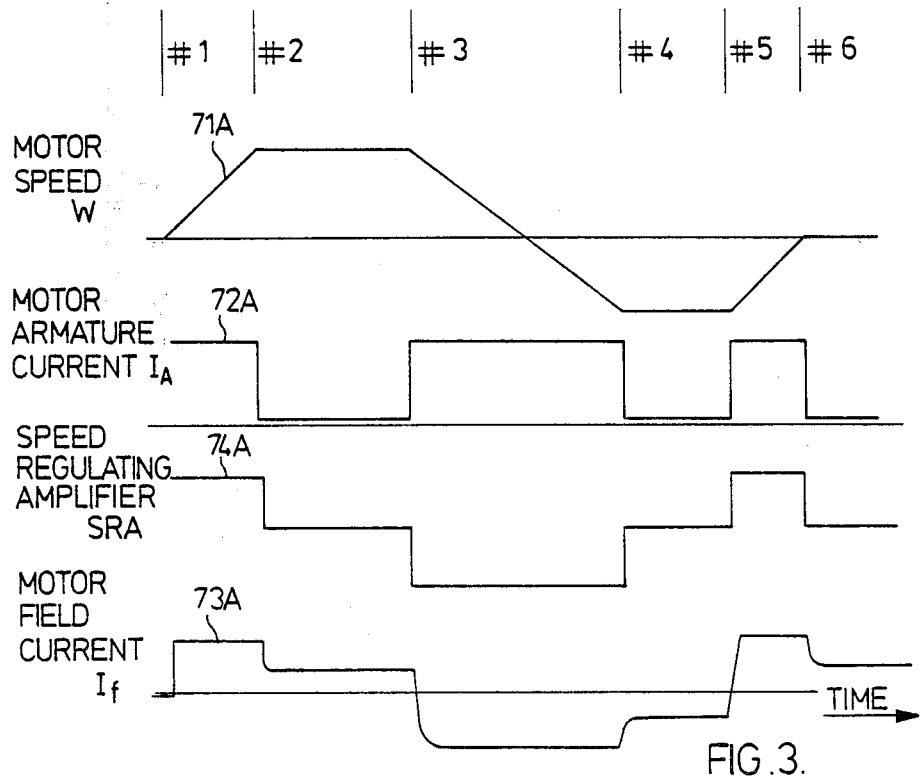

An improvement in operation may be seen in FIGS. 2 and 3 where FIG. 2 shows four curves 71, 72, 73 and 74 representing operational characteristics without the compensating circuits of this invention, and FIG. 3 shows the same four curves 71A, 72A, 73A and 74A when the compensating circuits are used.

Referring to FIGS. 2 and 3, period 1 represents a time interval of acceleration, period 2 represents running at a desired speed, period 3 represents a time interval during which deceleration takes place requiring a field reversal and regeneration, period 4 represents a steady state or constant speed in reverse, and period 5 represents acceleration from the reverse speed to a rest condition. It will be seen that during acceleration, i.e., in period 1, there is no difference in the operation, but during period 2 where a constant speed is required, there is some hunting or speed fluctuation without compensation as indicated by motor speed curve 71 in period 2. In this period 2 both the armature current, represented by curve 72, and field current, represented by curve 73, have low values resulting in a low torque. Variations in speed may cause the field to reverse in an attempt to hold speed constant. It is important that in the control of this invention, the build-up up of armature current is not constrained as the field reverses during regenerative braking. The armature current is allowed to assume its required value while the build-up of field current is accelerated by transiently applying a voltage to the motor field that may be several times larger than the rated value.

It is believed the invention and its application to used other than vehicle drives will be apparent from the preceding description.

What we claim as new and desire to secure by Letters Patents of the United States of America is:

1. A motor control for a direct current motor having an armature and a field winding, and hving a power source for providing armature current and for providing field current, said motor being operable in a motoring and in a regenerative braking state with field reversal in the braking state, comprising
    means for providing a first control signal representing the difference between an input speed reference signal and an actual motor speed signal,
    means for deriving a signal representing actual field current,
    means for converting said signal representing field current into a signal representing field strength,
    means for modifying said first control signal by summing it with a compensating signal derived from a product of a limited value of said signal representing field strength and a predetermined fraction of said first signal to provide torque compensation, and
    means responsive to said modified first signal for controlling armature current and field strength.

2. A motor control as defined in claim 1 in which said means for deriving a signal representing field current is a current sensor connected to the field current circuit.

3. A motor control as defined in claim 1 in which said means for converting said signal representing field current into a signal representing field strength is a circuit which simulates the saturation curve of the motor field current versus motor field strength.

4. A motor control circuit as defined in claim 1 in which said means responsive to said modified first signal for controlling armature current and field strength comprises,
    a current regulating amplifier means including means for summing said modified first signal and a signal representing armature current and providing therefrom a second signal, another means for amplifying said second signal,
    means responsive to said amplified second signal for controlling said power source for providing armature current,
    a field regulating amplifier means including means for summing said modified first signal and said signal representing field strength and providing therefrom a third signal, and means for amplifying said third signal, and
    means responsive to said amplified third signal for controlling said power source for providing field current.

5. A motor control for a direct current motor having an armature and a field winding, and having an alternating power source connected to a first converter for providing armature current to said armature and connected to a second converter for providing field current to said field winding, said motor being operable in a motoring and in a regenerative braking state with field reversal in said braking state, comprising
    means for providing a first signal representing an input speed reference signal,
    means for deriving from said motor a second signal representing the actual speed of said motor,
    summing means for summing said first and second signals to derive a third signal representing the difference between the first and second signals,
    means for deriving from said field winding a fourth signal representing actual field current,
    converting means for receiving said fourth signal and converting said fourth signal into a fifth signal representing field strength,
    limiting means for limiting said fifth signal,
    summing means for summing a predetermined fraction of said third signal and said limited fifth signal to derive a sixth signal representing the difference therebetween,
    means responsive to said sixth signal for controlling said first converter and thereby controlling said armature current, and
    means responsive to said sixth signal for controlling said second converter and thereby controlling said field current.

6. A motor control as defined in claim 5 in which said means responsive to said sixth signal for controlling said first converter comprises,
    absolute value circuit means for receiving said sixth signal and providing as an output a seventh signal corresponding to said sixth signal without regard to sign,
    means for deriving an eighth signal representing armature current.

summing means for summing said seventh and eighth signals to derive a ninth signal representing the difference therebetween, and means for applying said ninth signal to said first converter for controlling said armature current.

7. A motor control as defined in claim 6 in which said means for applying said ninth signal to said first converter comprises, means for deriving a tenth signal representing actual armature voltage, summing means for summing said ninth and tenth signals to derive an eleventh signal representing the difference therebetween, and means for applying said eleventh signal to said first converter for controlling said armature current.

8. A motor control as defined in claim 7 in which said means responsive to said sixth signal for controlling said second converter comprises, limiting means for limiting said sixth signal, summing means for summing said limited sixth signal and said fifth signal to derive a twelfth signal representing the difference therebetween, and means for applying said twelfth signal to said second converter for controlling said field current.

* * * * *